F. T. ROBERTS.
APPARATUS FOR MAKING HOLLOW RUBBER ARTICLES.
APPLICATION FILED OCT. 11, 1915.

1,201,503.

Patented Oct. 17, 1916.
3 SHEETS—SHEET 1.

INVENTOR
Fred Thomas Roberts
BY Albert H. Baker
ATTORNEY

F. T. ROBERTS.
APPARATUS FOR MAKING HOLLOW RUBBER ARTICLES.
APPLICATION FILED OCT. 11, 1915.

1,201,503.

Patented Oct. 17, 1916.
3 SHEETS—SHEET 2.

INVENTOR
Fred Thomas Roberts,
By Albert H. Baker,
ATTORNEY.

F. T. ROBERTS.
APPARATUS FOR MAKING HOLLOW RUBBER ARTICLES.
APPLICATION FILED OCT. 11, 1915.
1,201,503.
Patented Oct. 17, 1916.
3 SHEETS—SHEET 3.
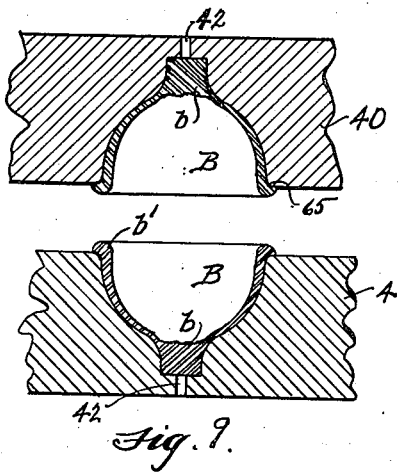
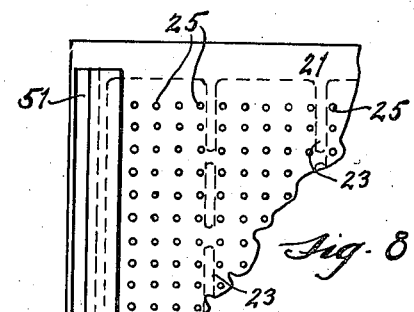
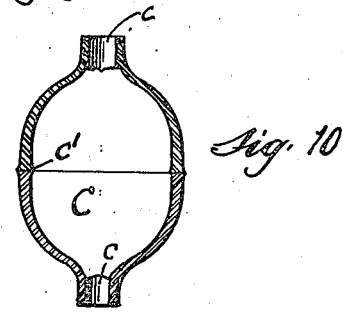
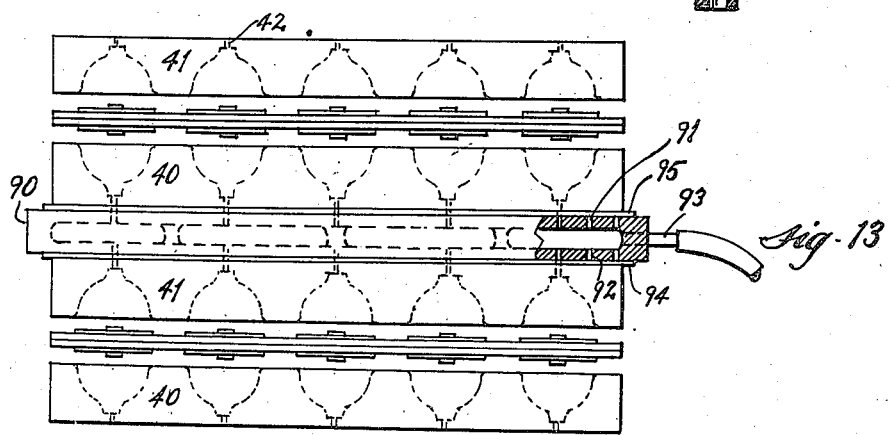
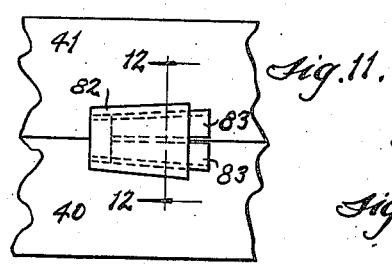
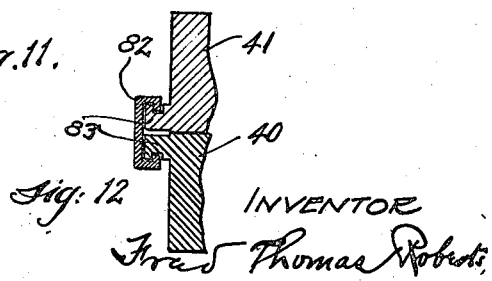
INVENTOR
Fred Thomas Roberts,
BY Albert H. Bates,
ATTORNEY

UNITED STATES PATENT OFFICE.

FRED THOMAS ROBERTS, OF TRENTON, NEW JERSEY.

APPARATUS FOR MAKING HOLLOW RUBBER ARTICLES.

1,201,503.  Specification of Letters Patent.  Patented Oct. 17, 1916.

Application filed October 11, 1915. Serial No. 55,131.

*To all whom it may concern:*

Be it known that I, FRED THOMAS ROBERTS, a citizen of the United States, residing at Trenton, in the county of Mercer and State of New Jersey, have invented a certain new and useful Improvement in Apparatus for Making Hollow Rubber Articles, of which the following is a full, clear, and exact description, reference being had to the accompanying drawings.

My application No. 51,338, filed September 18th, 1915, describes and claims a process of making hollow rubber articles wherein rubber stock is drawn by a vacuum into mold cavities while the edges of the stock are suitably held across the mouths of the cavities, the coöperating parts of the molded stock being thereafter brought into contact and vulcanized. In such operation compressed air may be entrapped within the article as the parts are brought together.

The object of the present invention is to provide a simple and efficient apparatus for carrying out such a process. The apparatus is hereinafter more fully described and its essential characteristics summarized in the claims.

Figure 1:
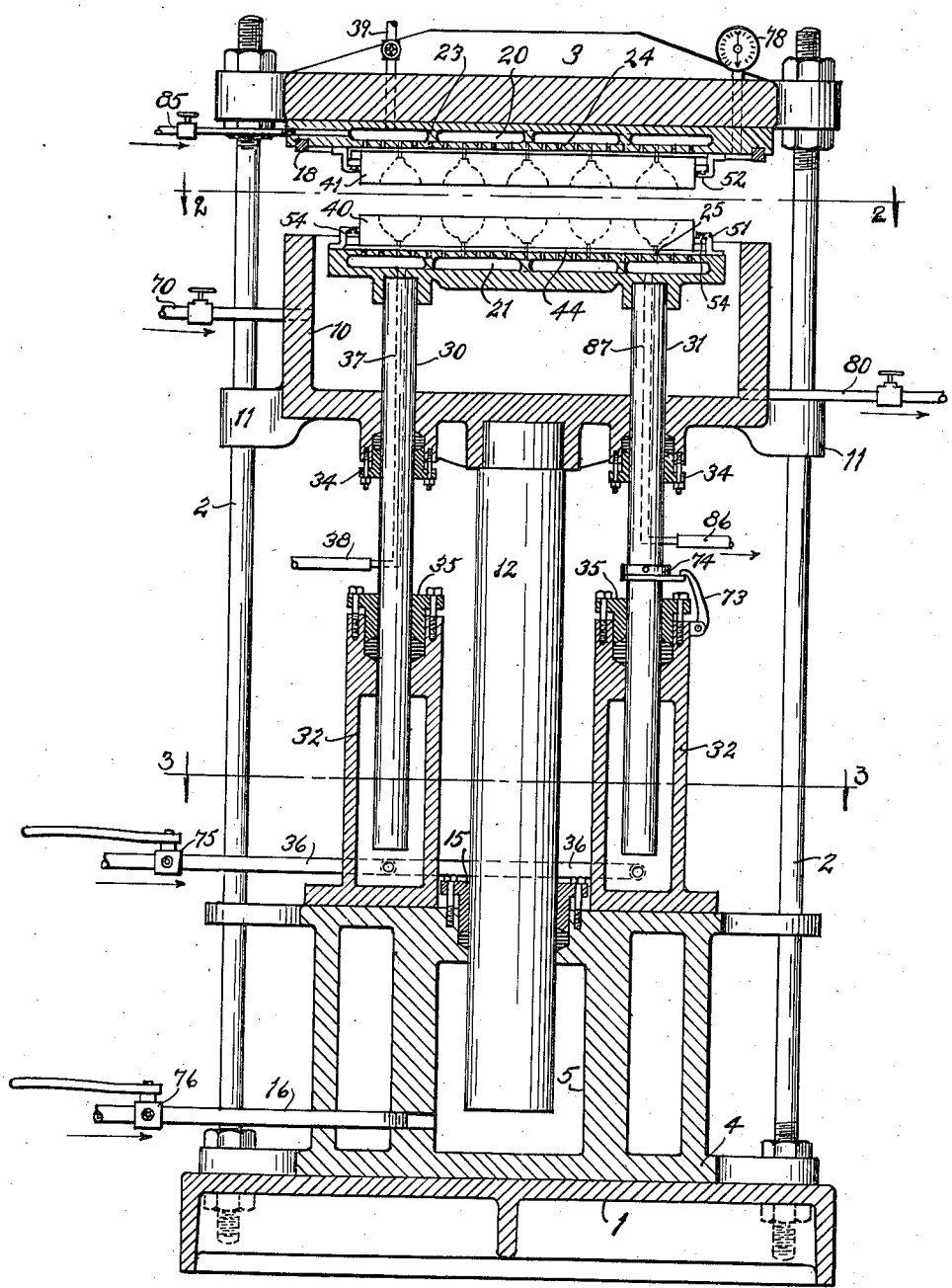
Figure 2:
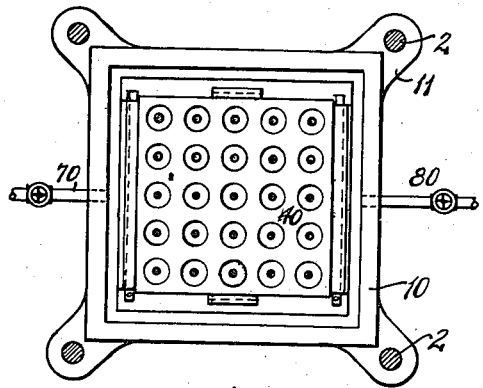
Figure 3:
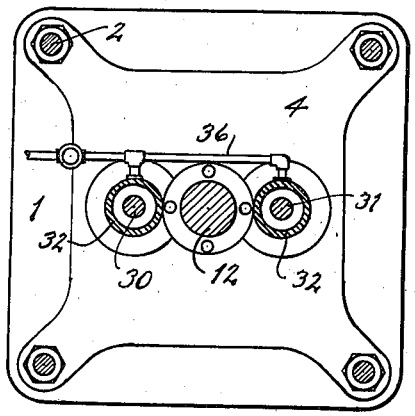
Figure 5:
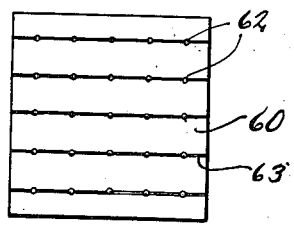
Figure 4:
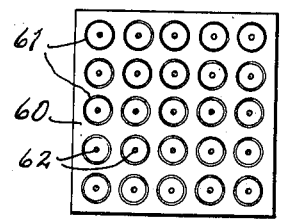
Figure 6:
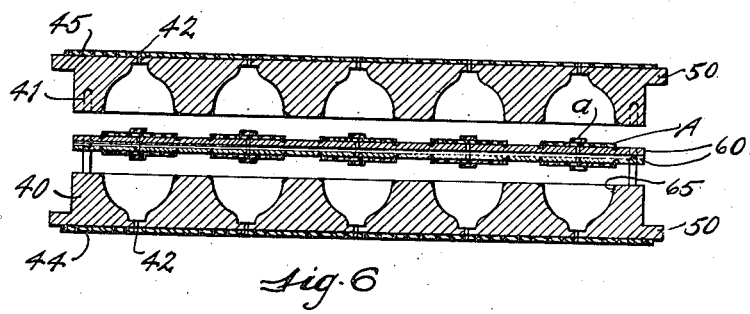
Figure 7:
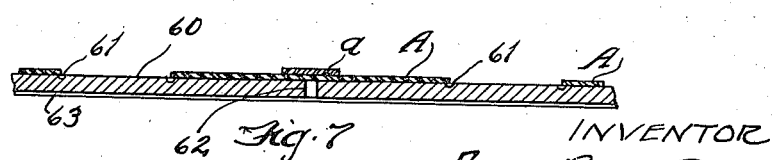

In the drawings, Figure 1 is a vertical section of the apparatus; Figs. 2 and 3 are horizontal sections on the lines 2—2 and 3—3 of Fig. 1; Figs. 4 and 5 are views of two sides of the plate for supporting the rubber stock previous to molding, one of these views being a plan and the other a bottom plan. Figs. 2 to 4 are drawn on the same scale, which is smaller than the scale of Fig. 1. Fig. 6 is a vertical section on a larger scale through a pair of separated mold plates with the material and the supports therefor between the plates ready to coact with the mold; Fig. 7 is a fragmentary view on a much larger scale of a portion of one of the supporting plates with some of the rubber stock resting thereon; Fig. 8 is a plan of one of the lower platen; Fig. 9 is a view in vertical section illustrating two of the coacting mold cavities after the stock has been drawn in place; Fig. 10 is a section of a finished bulb designed to be produced by the specific mold shown; Figs. 11 and 12 are details illustrating a clamp which may be employed for holding the two mold plates together, showing such clamp respectively in side elevation and cross section; Fig. 13 is a side elevation, somewhat diagrammatic, illustrating the employment of a plurality of superimposed molds with intermediate vacuum connections, this view being intended as illustrative of any desired number of such molds and connections.

The apparatus shown in Fig. 1 has a base 1, upright rods or standards 2 carried thereby, a head 3 secured to the rods near their upper ends, a casting 4 resting on the base and providing an internal cylinder 5 and also a support for parts above. I have shown suitable nuts on the rods clamping the base, the casting and the head in place, and the parts so clamped, together with the rods, constitute the main frame of the machine.

10 indicates a tank or receptacle slidably guided on the rods 2 by means of ears 11 embracing those rods. This tank is mounted on the upper end of a plunger 12 which extends into the cylinder 5. A suitable stuffing box 15 embraces this plunger and is carried by the upper portion of the cylinder.

16 indicates a pipe leading to the cylinder 5, whereby hydraulic pressure may be applied to the lower end of the plunger to raise the tank 10. When raised, the upper edge of the wall of the tank abuts a stationary gasket 18 lying directly above the wall to make an air tight connection.

20 and 21 indicate hollow rectangular platens. The platen 21 is secured to the under face of the head 3 and incidentally carries near its outer edge the gasket 18 above referred to. The platen has one continuous cavity through it, though the under face is preferably strengthened by isolated connecting parts 23. Numerous holes 24 are made through the lower wall or face of the platen. The platen 21 is of similar construction, having the internal cavity and the holes 25 extending upwardly therefrom to the face of the platen. The lower platen 21 is supported by a pair of plungers 30 and 31, the upper ends of which are secured to the platen. These plungers extend through the bottom of the tank 10 into a pair of cylinders 32 mounted on the top of the casting 4. These plungers are embraced by suitable stuffing boxes 34 carried by the tank 10 and other stuffing boxes 35 carried by the cylinders 32. A suitable pipe 36 communicates with the two cylinders 32, whereby hydraulic pressure may be admitted to raise the plungers. Admission to the cavity of the lower platen is obtained by a tubular passageway 37 in the plunger 30, which passageway is adapted to be in communication with a pipe 38. A pipe 39 leads to the cavity in the platen 20. These pipes 38 and 39 provide the means for exhausting the air from the platens.

The mold plates, as illustrated in a number of views, are preferably rectangular blocks 40 and 41 having several cavities corresponding in contour to the two portions of the article to be molded. The drawings show twenty-five cavities in each mold plate arranged in five rows of five each, though this number may be varied as desired. An opening 42 is made from each cavity through to the opposite face of the mold plate. These mold plates are preferably clamped against the respective platens on an intermediate sheet of rubber 44 and 45 which has holes through it registering with the holes 42. There are preferably a large number of holes 24 and 25 through the platens, some of these holes registering with the holes through the rubber plate and others being closed by the rubber plates. Accordingly, when the molds and rubber plates are in place on the platens there is a continuous passageway from each cavity to the respective source of vacuum (indicated by the pipes 38 and 39), enabling the air to be exhausted from the various cavities.

To clamp the mold plates accurately, effectively and easily in place on the platens, I provide each mold plate with an edge rib 50 which is adapted to lie beneath overhanging flanges 51 secured to the platen 21 or above corresponding flanges 52 secured to the platen 20, the mold plate being shoved into place from the front in Fig. 1. When in this position the plates are effectively clamped by wedges driven between the flanges on the platen and the ribs on the mold plates. Such wedges are designated 54. They may conveniently have a dovetailed sliding connection with the platen flanges.

Figs. 4, 5, 6 and 7 illustrate metal plates 60 adapted to support the sheets of rubber stock as they are put in place between the molds. This metal plate has on one face annular grooves 61, the diameter of which corresponds with the diameter of the rubber stock which is preferably of disk form shown at A. These annular grooves, therefore, serve to enable the accurate positioning of the stock and they perform another function, hereinafter stated. Extending through the plate within each annular groove is an opening 62, and on the under side of the plate are grooves 63 registering with the openings. After the rubber disk has been placed on two of these plates and are held there by their own adhesion, two of the plates are placed back to back and located between the molds, as shown in Fig. 6.

Then, if the molds are brought together it will be seen that the edges of the rubber stock are clamped around the edges of the mold cavities. To bring the mold plates together it is simply necessary to admit hydraulic pressure to the pipe 36, which acts upwardly on the plungers 30 and 31, raising the lower mold plate. When the parts are in this position a vacuum applied to the pipes 38 and 39 will exhaust air from the mold cavities, wherefore the rubber stock is drawn into the cavities, as shown in Fig. 9. In this movement, atmospheric air is admitted between the rubber stock and the supporting plate 60 through the grooves 63 and openings 62 described.

The specific shape of the mold cavities shown is designed for manufacturing atomizer bulbs of the final form shown in Fig. 10. The raw rubber stock for each half preferably consists of a disk A and a smaller part of rubber $a$, as shown in Figs. 6 and 7. When such stock is drawn into the mold cavity shown, it produces the general shape indicated at B, the small rubber disk $a$ providing for the thickened boss $b$ of the molded article, which may be afterward drilled to produce the tubular opening shown at $c$ in Fig. 10. The annular groove 61 referred to in the supporting plate, together with the rounded edge 65 of the mold cavity produces a rounded bead $b'$ at the edge of the molded section. When the halves of the article have been molded as described, they are adapted to be brought together to complete the closed article. Preceding such bringing together the mold plates are separated by releasing the hydraulic pressure in the pipe 36, and the stripped plates 60 are removed. It may be desirable to obtain an internal pressure in excess of atmospheric pressure within the cavities of the articles, as they are brought together, and it is to accomplish this that I provide the tank 10 heretofore mentioned, the operation of which will now be described.

After the mold plates carrying their half sections have been separated (being thus in the position shown in Fig. 1), hydraulic pressure is admitted through the pipe 16 to the cylinder 5, which, acting upwardly on the plunger 12, raises the tank 10 into engagement with the gasket 18. To prevent the plungers 30 and 31 being carried upward by friction in this movement, I provide a suitable catch, as, for example, the hook 73 carried by one of the cylinders 32 and adapted to overhang a collar 74 on the plunger 31. After the upper edge of the wall 10 has come into contact with the gasket 18, the valve is opened in a pipe 70, which may be connected with a suitable supply of compressed air, and compressed air is thus admitted to the interior of the tank, this compressed air surrounding the mold and passing into the interior of the cavities. Then the latch 73 is turned back and hydraulic pressure admitted to the cylinders 32, thus bringing the mold plates together which present the edges of the articles to each other to cause them to adhere, entrapping compressed air within the closed articles. The desired operation of the two sets of plungers is easily obtained by turning the handles on two valves or cocks 75 and 76 on the pipes 15 and 16, each valve having a position when it admits fluid under pressure to the cylinder, a second position when it holds such fluid entrapped, and a third position when it vents the cylinder.

A pressure gage 78 is in communication with the space within the vessel 10 and thus enables an exact and desired amount of pressure to be attained within the interior of the closed article. The closed article is vulcanized with this pressure within it, and while the article is within the mold. After vulcanization and the removal of the article, if it is to constitute an open bulb, for example, an opening into it releases the pressure. The bulb C shown in Fig. 10, has two drilled openings $c$. This figure shows the vulcanized circular joint $c'$. The vulcanization may be accomplished within the press shown, or at some other point. If the mold plates are to be removed for vulcanization, the operation is as follows: The air is relieved from the tank 10, a vent pipe 80 providing for this, and the pressure is relieved in the cylinder 5, causing the tank to descend. Then suitable clamps are driven on the mold to hold them together. These clamps are shown in Figs. 11 and 12 as consisting of a U-shaped member 82 having internal wedge faces which coact with wedge-shaped lugs 83 on the mold plates. When these keepers are driven in place the two plates may be removed to any convenient vulcanizer.

Should it be desirable to vulcanize the articles while in the press, the air pressure is relieved through the vent 80 and steam is admitted to the interior of the vessel 10. This steam may enter through the same pipe 70, if desired. Also, if desired, steam may be admitted through the pipes 38 and 39 into the spaces provided for vacuum, as above described. Circulation of this steam may be provided by opening the normally closed vent 80 from the chamber 10, a normally closed vent 85 from the cavity of the platen 20, and a normally closed vent 86 connected with the cavity of the platen 21 by a passageway 87 in the plunger 31. After the steam vulcanization is completed, the parts may be cooled by the admission of water through the same pipes, the vents described allowing the escape of the water.

The apparatus described is shown in Fig. 1 as acting on a single pair of mold plates. If desired, however, several pairs may be superimposed one over the other by placing between them intermediate hollow platens which are connected with the source of vacuum. This is illustrated in Fig. 13, where two pairs of mold plates are shown with an intermediate hollow platen 90 between them. This platen has openings 91 and 92 leading upwardly and downwardly from it, and it has an external connection 93 with the source of vacuum. Suitable rubber plates 94 and 95 similar to the plates 44 and 45 are placed on opposite sides of this platen and coact with the molds above and below the platen. Any suitable means may be employed for supporting the intermediate platen and the mold plates carried by it when the parts are separated.

Having thus described my invention what I claim is:

1. In an apparatus of the character described, the combination with a pair of hollow coöperating platens one of which is movable, of mold plates separate from the platens and having cavities in communication with the interior of the platens, and a tubular connection with the platens whereby air may be exhausted from the mold cavities.

2. The combination of a hollow platen having openings to its face, a mold plate movable independently of the platen and adapted to rest against said platen and provided with a series of cavities each having an opening to the opposite side of the plate, and means for holding the plate in place on the platen with their openings communicating, and means for exhausting the air in the platen.

3. The combination of a pair of hollow coöperating platens, a pair of mold plates independent of the platens, openings whereby the cavities of the mold plates may communicate with the cavities of the platens, and means for clamping the mold against the platens.

4. The combination with a hollow platen, of a mold plate having a series of cavities, openings through the cavities to the opposite side of the mold plate, a sheet of rubber or similar material between the mold plate and platen, and a passageway in communication with the interior of the platen whereby air may be exhausted from the cavities.

5. The combination of a hollow flat platen, openings from the interior of the platen to its face, a mold plate having a series of cavities, openings from the cavities to the other side of the mold plate, pads having openings and adapted to lie between the mold and platen, means for locking the mold plate in place on the pad on the platen, and means for exhausting the air from the platen.

6. The combination of a pair of hollow flat platens facing each other and one of which is movable, openings from the interior of each platen to its face, tubular passageways communicating respectively with the interior of the platens, a pair of mold plates each having a series of cavities, openings from the cavities to the other side of the mold plate, pads having openings and adapted to lie between the respective molds and platens, and means for locking the mold plates in place on the pads on the platens.

7. The combination of a hollow platen, a mold plate, openings whereby the cavities of the mold plate may communicate with the cavities of the platen, a rib on the edge of the mold plate, and a wedge coacting with said rib for clamping the mold plate against the platen.

8. The combination with a hollow platen, of a mold plate adapted to rest thereon having cavities in communication with the hollow of the platen, a plunger for moving the platen, and a tubular opening in said plunger communicating with the interior of the platen.

9. The combination of a press having a head, a hollow downwardly facing platen carried by said head, a movable upwardly facing hollow platen, mold plates each having a series of cavities adapted to be mounted below and above the respective platens and have their cavities in communication with the cavities of the platens, a plunger for raising the lower platen, and means for exhausting the air in the interior of the platens.

10. The combination of a press having a head, a hollow downwardly facing platen carried by said head, a movable upwardly facing hollow platen, coöperating mold plates each having a series of cavities and adapted to be positioned between the respective platens and have their cavities in communication with the cavities of the platens, means for supporting the upper mold plate in coaction with the upper platen, a plunger for raising the lower platen, a tubular passageway in said plunger leading to the interior of the lower platen, and a tubular passageway leading to the interior of the upper platen.

11. The combination with an inclosing device comprising a head and a relatively movable box having a base and side wall, of a pair of hollow platens adapted to be inclosed by said device, means for moving one of said platens relatively to the other when said device is closed, means whereby air may be exhausted from said platens, and means for admitting fluid under pressure to the inclosure.

12. The combination with a suitably supported head, of a pair of mold plates, one of which is suspended on the under face of the head, a movable receptacle below the head having a closed bottom and a wall, means for raising said receptacle to close the space between it and the head, and means for supporting the lower mold section within the chamber thus provided.

13. The combination of a suitably supported head, means for suspending a downwardly facing mold on the under face of the head, a platform beneath the head, the lower member of the mold being adapted to rest on said platform, a movable receptacle extending beneath the platform and having a wall adapted to lie outside of it, said wall being adapted to stand a distance below the head, a plunger adapted to raise said receptacle to close the space between it and the head, and means for supplying fluid under pressure to the chamber thus provided.

14. The combination of a suitably supported head, means for suspending a downwardly facing mold on the under face of the head, a platform beneath the head, the lower member of the mold being adapted to rest on said platform, means for exhausting the air from the cavities of the mold, a movable receptacle extending beneath the platform and having a wall adapted to lie outside of it, said wall being adapted to stand a distance below the head, a plunger adapted to raise said receptacle, a gasket supported by the head for making a tight connection with said wall when raised, and means for supplying fluid under pressure to the chamber thus provided.

15. The combination of a pair of mold plates, a head and a movable platen between which the plates stand, a plunger for moving said platen, means adapted to inclose the plates including a movable receptacle adapted to co-act with the head, said plunger extending movably through the receptacle, means for exhausting air from said platen and means for moving the receptacle.

16. The combination of a stationary head, of a movable receptacle, the wall of which is adapted to coact with the head or be spaced therefrom, a plunger for moving said receptacle, a hollow platen carried on the face of the head toward the receptacle, a movable hollow platen within the receptacle, means for exhausting air from said platens, and a plunger extending through the base of the receptacle for moving the movable platen.

17. The combination of a head, a movable receptacle, the wall of which is adapted to coact with the head or be spaced therefrom, a plunger for moving said receptacle, a platen carried on the face of the head toward the receptacle, a movable platen within the receptacle, a plunger extending through the base of the receptacle for moving said movable platen, said platens being hollow, and means communicating with the interior thereof whereby the air may be exhausted therefrom.

18. The combination with a head, of a receptacle having a base and side wall, the side wall being adapted to coact with the head or stand spaced from it, a plunger for so moving the receptacle, a platen within the receptacle having a plunger extending through the base of the receptacle, a co-acting platen carried on the face of the head toward the receptacle, and a catch adapted to engage the plunger connected with the platen to hold the same against movement resulting from friction with the receptacle.

19. The combination with an inclosing device having a head and a movable receptacle, of a pair of hollow platens adapted to be inclosed by said device, means whereby air may be exhausted from said platens, means for admitting fluid under pressure to the inclosure, means for moving the receptacle, and a plunger connected with one of the platens and movably extending through the receptacle.

20. In a device of the character described, the combination of a base, standards rising therefrom, a head carried by said standards, an upwardly facing receptacle below the head, a plunger for said receptacle, a movable hollow platen within the receptacle, means for exhausting air from said platen and a plunger for moving it passing through the base of the receptacle.

21. The combination with a base, of standards rising therefrom, a stationary head carried by the standards, a movable upwardly facing receptacle guided by said standards, a central plunger on the under side of the receptacle for shoving it upwardly, a platen within the receptacle, a plurality of plungers depending from the platen passing through the base of the receptacle and spaced about the plunger first mentioned.

22. The combination of a base, a cylinder resting thereon, a plurality of cylinders supported at the top of the cylinder first mentioned and spaced equi-distantly about the axis thereof, a receptacle, a central plunger therefor co-acting with the first mentioned cylinder, a platen within the receptacle, and a plurality of plungers therefor extending through the base of the receptacle into the other cylinders mentioned.

23. The combination of a base, a main cylinder mounted thereon, a plurality of cylinders supported above the cylinder first mentioned, upright standards rising from the base, a movable receptacle consisting of a base and wall, a plunger connected with the base and occupying the main cylinder, a platen within the receptacle, a plurality of plungers depending from the platen passing through the base of the receptacle and occupying the upper cylinders, a head carried by said standards, and an upper platen secured on the under face of the head.

24. The combination with a pair of mold plates, of a supporting plate adapted to be placed between the mold plates when separated and carry the stock for molding, said supporting plate having a series of annular grooves in one face, and openings through the plate from the spaces within the grooves.

25. The combination with a pair of separable mold plates, of a supporting plate having on one face a series of annular grooves, openings through the plate, and in the other face grooves communicating with the openings and leading to an edge of the plate.

26. The combination with a pair of separable mold plates having facing cavities, a pair of supporting plates adapted to be placed between the mold plates and carry stock on their upper and under faces, said supporting plates having means for admitting air to the spaces between them and the stock, and means enabling the exhaustion of air from the cavities of the molds.

27. The combination with a pair of separable mold plates having facing cavities, a pair of supporting plates adapted to be placed between the mold plates and carry stock on their upper and under faces, said supporting plates having means for admitting air to the spaces between them and the stock, a pair of hollow platens against which the molds may rest, the cavities of the molds being in communication with the cavities of the platens, and passageways to the platens whereby the air may be exhausted from the cavities after the mold plates have been brought together upon the interposed stock and supporting plates.

In testimony whereof, I hereunto affix my signature.

FRED THOMAS ROBERTS.

Witness:
HERBERT R. STRAUSS.